Patented June 26, 1951

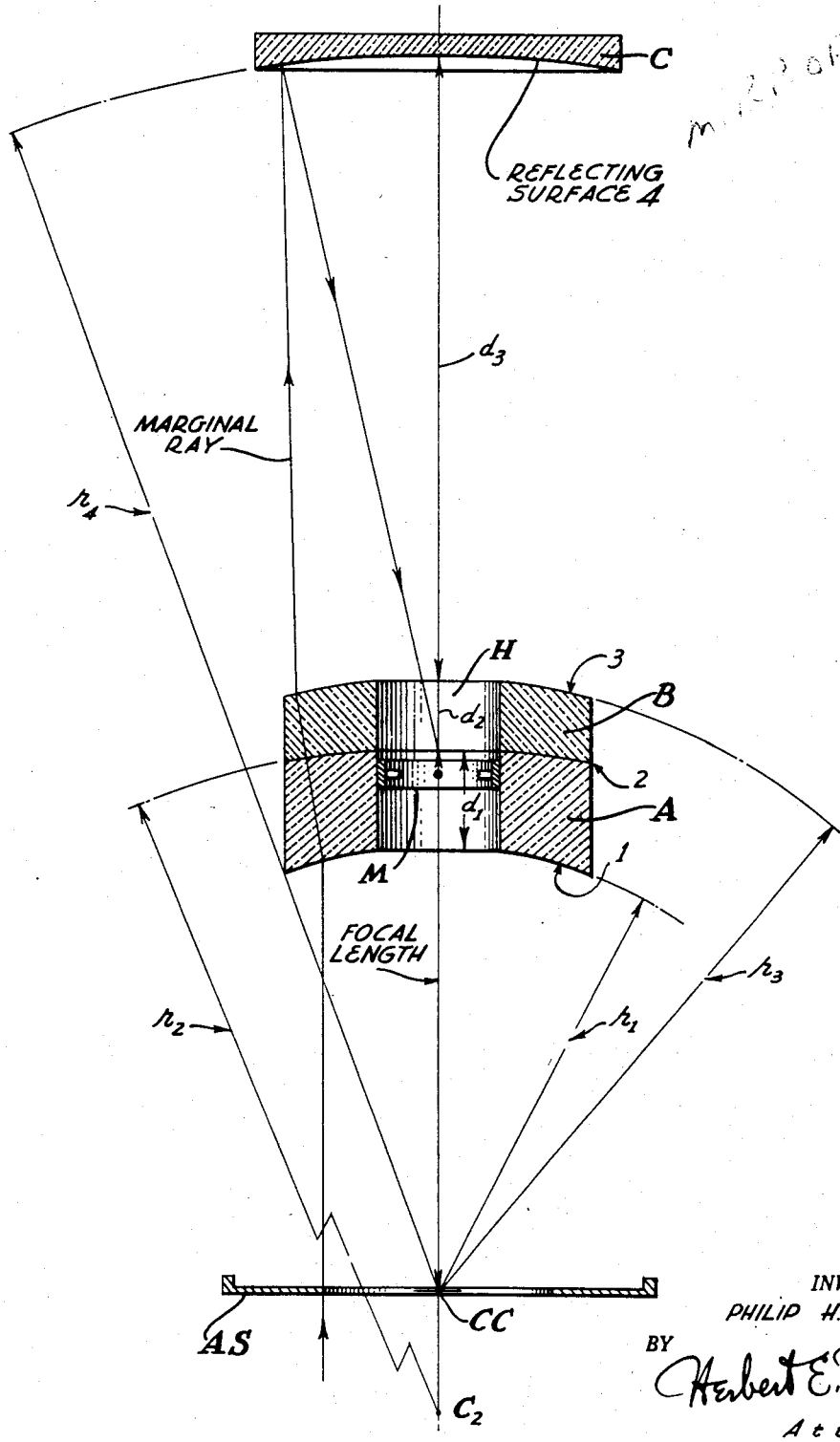

2,558,593

UNITED STATES PATENT OFFICE 2,558,593

REFLECTING TELESCOPE

Philip H. Taylor, Los Angeles, Calif., assignor to Northrop Aircraft, Inc., Hawthorne, Calif., a corporation of California Application March 25, 1949, Serial No. 83,330

1 Claim. (Cl. 88—32)

My invention relates to telescopes and more particularly to a monocentric catadioptric telescope.

Among the objects of the invention are:

To provide a mirror-lens telescope system that is fully corrected for spherical aberration and for primary color.

To provide a mirror-lens telescope wherein the lens element can be used to support an energy detecting device in the focal plane of the telescope.

To provide a mirror-lens telescope system wherein the extra axial aberrations of coma, astigmatism, and distortion are zero by definition.

To provide a mirror-lens telescope system wherein the extra axial aberrations of oblique, spherical and lateral color are effectively reduced to zero.

And to provide a simple and efficient telescope of relatively short focal length.

The invention can be more fully understood by reference to the drawing, which shows one preferred embodiment of the invention.

The telescope has three optical elements, a pair of divergent meniscus lenses A and B one of which is divergent and one convergent, and which together, form a divergent meniscus lens, cemented to form a doublet, and a convergent spherical mirror C. The cemented lenses A and B have a central hole H therein and all air exposed surfaces of the optical system are concave objectwise. Lens A is a divergent light barium crown lens, and lens B is a convergent light flint lens, each lens having the same index of refraction for the D line of sodium (5893 Å.).

The air exposed surfaces are the front surface 1 of lens A, the rear surface 3 of lens B and the mirror surface 4 of mirror C. These air exposed surfaces 1, 3, and 4 are all spherical and have a common center of curvature CC, the respective radii being designated $r_1$, $r_3$, and $r_4$.

The second (cemented) surface 2 is also spherical, but has a center of curvature $C_2$ displaced slightly objectwise from the center of curvature CC of the air exposed surfaces 1, 3, and 4. However, since the cemented surface 2 does not deviate the D line of sodium, the described optical system can be termed truly monocentric for this wavelength. The mirror surface 4 is fully aluminized. The image is formed in hole H at the level of the cemented surface 2 over an area which is a spherical sector centered at the common center CC.

The optical system as described will, of course, be mounted in accordance with the desired use, but in any event will be provided with an aperture stop AS in front of the front surface 1 at the level of the common center CC of the surfaces 1, 3, 4 and the image. The diameter of the aperture is slightly less than the diameter of the meniscus lenses A and B.

In order to utilize the image, an energy sensitive device such as, for example, a photographic plate or a photoelectric cell can be placed in the hole H. Such energy sensitive devices can be supported directly from the interior surface of the hole H as, for example, by metal band M supported by the wall of hole H. This feature eliminates the necessity for the use of opaque supporting members crossing the light path.

The following table gives all of the data necessary to, and sufficient for, the construction of one particular embodiment of the invention.

| Radii and Thickness | Glass | $N_D$ | V |
|---|---|---|---|
| $r_1$—7.2886 in. | | | |
| $d_1$—1.6000 in. | LBC-2 | 1.5725 | 57.4 |
| $r_2$—13.0344 in. | | | |
| $d_2$—1.1114 in. | LF-1 | 1.5725 | 42.5 |
| $r_3$—10.000 in. | | | |
| $d_3$—10.000 in. | | | |
| $r_4$—20.000 in. | | | |

Focal length=8.8 inches
Diameter of mirror=6 inches
Diameter of doublet=5 inches Where $r_1$ and $r_3$ are respectively the radii of the front and rear surfaces of the doublet, $r_2$ the radius of the cemented surface and $r_4$ the radius of the mirror, and where $d_1$ and $d_2$ are respectively the axial thicknesses of doublet lenses A and B and wherein $d_3$ is the axial distance between surfaces 3 and 4.

The symbols and abbreviations used in the above table are defined fully in the standard reference book "Applied Optics and Optical Design" by A. E. Conrady, published by the Oxford University Press, 1929.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

I claim:

A telescope comprising one divergent and one convergent spherical surfaced lenses cemented together to form a doublet, said doublet having a central aperture therein, and a spherical mirror positioned to reflect light refracted by said doublet into an image area positioned in said aperture, said lenses and mirror having the following dimensions and characteristics:

| Radii and Thickness | Glass | Index of refraction | Dispersion |
|---|---|---|---|
| $r_1$—7.2886 in. $d_1$—1.6000 in. | Light Barium Crown. | 1.5725 | 57.4 |
| $r_2$—13.0344 in. $d_2$—1.1114 in. $r_3$—10.000 in. $d_3$—10.000 in. $r_4$—20.000 in. | Light Flint | 1.5725 | 42.5 |

Focal length=8.8 inches
Diameter of mirror=6 inches
Diameter of doublet=5 inches where $r_1$ is the raduis of the front surface of the doublet, $r_2$ is the radius of the cemented surface, $r_3$ the radius of the rear surface of the doublet and $r_4$ is the radius of the mirror; where $d_1$ is the axial thickness of the front lens, $d_2$ the axial thickness of the rear lens, and $d_3$ the axial distance between the rear surface of the doublet and the mirror.

PHILIP H. TAYLOR.

REFERENCES CITED

The following references are of record in the file of this patent:

UNITED STATES PATENTS

| Number | Name | Date |
|---|---|---|
| 2,304,755 | Zworykin | Dec. 8, 1942 |
| 2,448,699 | Bouwers | Sept. 7, 1948 |
| 2,455,476 | Epstein | Dec. 7, 1948 |
| 2,492,461 | Bouwers | Dec. 27, 1949 |

OTHER REFERENCES

Hendrix et al.: Article in "Telescoptics" in Scientific American, August 1939, pages 118–123, published in New York city. Photocopy in Division 7 in (88–32) A.

Bouwers: "Achievements in Optics," pp. 24, 25, 39, 64, 65, published by Elsevier Pub. Co., New York city, 1946. Copy in Division 7.